Nov. 5, 1963  J. W. WEAVER ETAL  3,109,262
PNEUMATIC MOTOR FOR SAND BLASTER
Filed July 18, 1962  4 Sheets-Sheet 1

INVENTORS
JACK W. WEAVER
BARNEY L. WEAVER, JR
BY Herbert J. Smith
ATTORNEY

Nov. 5, 1963   J. W. WEAVER ETAL   3,109,262
PNEUMATIC MOTOR FOR SAND BLASTER
Filed July 18, 1962   4 Sheets-Sheet 2
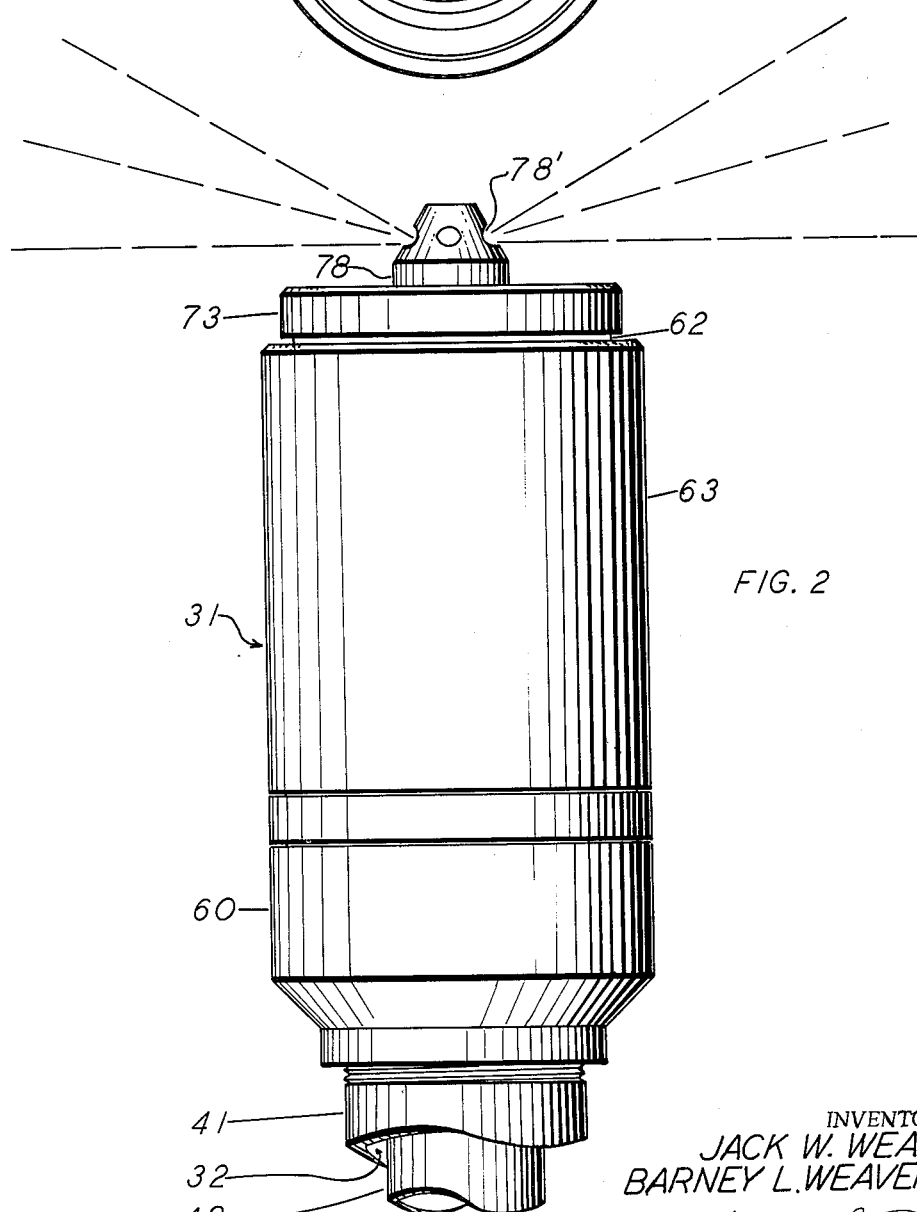
INVENTORS
JACK W. WEAVER
BARNEY L. WEAVER, JR
BY Herbert J. Smith
ATTORNEY Nov. 5, 1963  J. W. WEAVER ETAL  3,109,262
PNEUMATIC MOTOR FOR SAND BLASTER
Filed July 18, 1962  4 Sheets-Sheet 3

FIG. 10 (10-A)

INVENTORS
JACK W. WEAVER
BARNEY L. WEAVER JR.
BY Herbert J. Smith
ATTORNEY

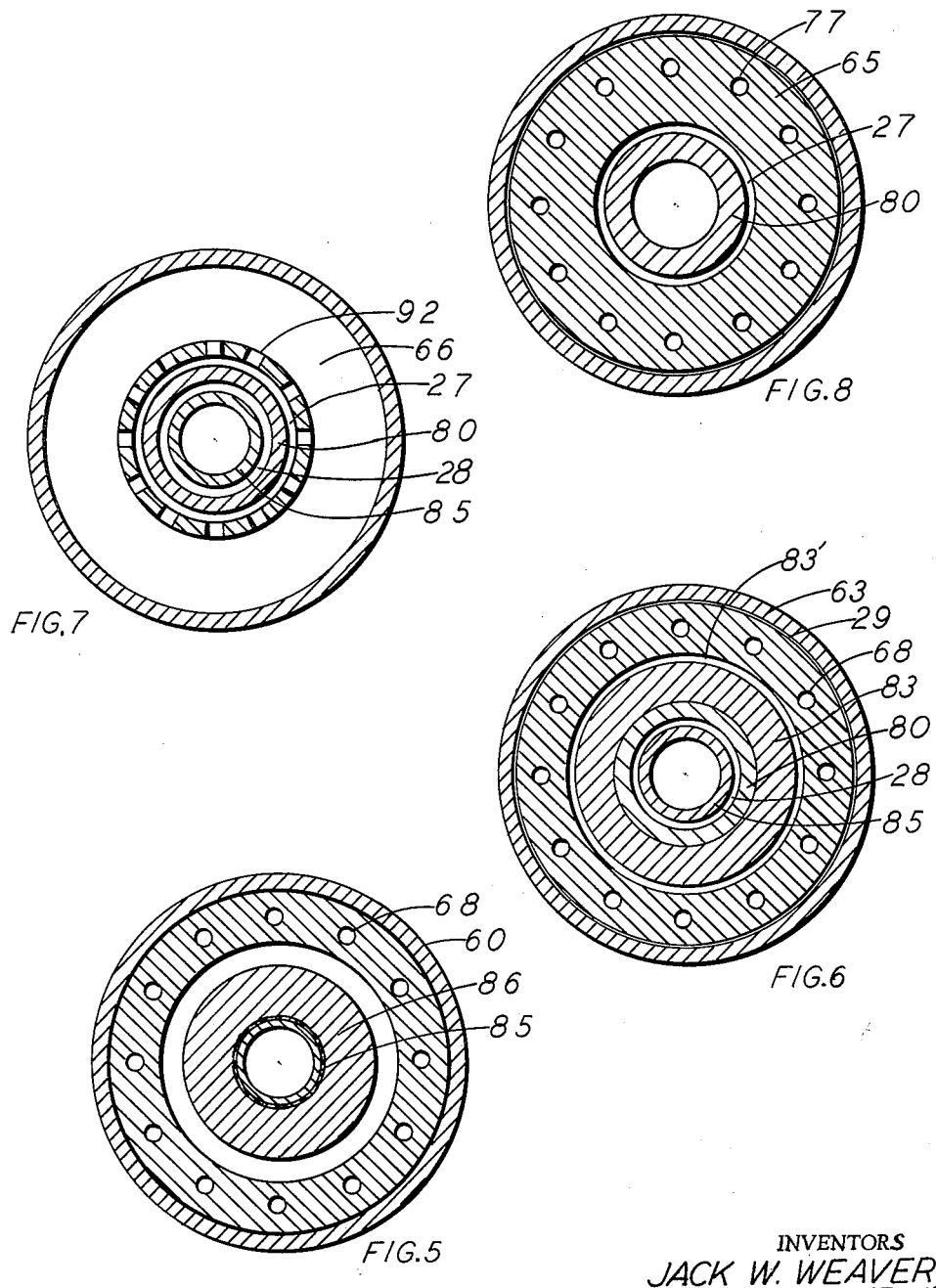

United States Patent Office 3,109,262
Patented Nov. 5, 1963

1

3,109,262
PNEUMATIC MOTOR FOR SAND BLASTER
Jack W. Weaver, P.O. Box 1584, and Barney L. Weaver, Jr., 5765 E. 30th Place, both of Tulsa, Okla.
Filed July 18, 1962, Ser. No. 210,777
15 Claims. (Cl. 51—8)

This invention relates to a pneumatic or air driven device such as an air motor having a stator or housing employed in conjunction with a rotor, and in one form uses a bearingless arrangement wherein fluid, in the present instance, air under pressure, is forced between the stator and rotor to maintain the rotor substantially centralized and in operational balance, both axially and radially relative to or within the stator. Accordingly, for all practical purposes, the rotor or spinner as it is generally referred to herein may be controllably rotated at low or high speed depending on the function desired from the apparatus.

One particular form that the invention may take is represented herein as a motor and nozzle employed as a sand blaster, with a modification utilizing a rotary wire brush cleaning tool mounted on the bearing type or bearingless rotor of the motor, wherein the air pressure for the motor drive uses its exhaust air pressure to do work, such as sandblasting with a suitable nozzle or moving the residue of wire brush cleaning in a particular direction to facilitate collection of the sand or residue.

Heretofore, in sandblasting apparatus, such as is used for internally cleaning of pipe to be surface-processed or cleaned, the operation required frequent or continuous turning of the pipe to be cleaned during the sandblasting operation. There is no other known device which satisfactorily rotates a sandblast nozzle, primarily because microscopic particles of sand and foreign matter soon filter internally of the motor and destroy the bearings, regardless of the bearing sealing and packing techniques used.

The present invention overcomes the problems extant, and it is a feature or object of the present invention to provide a novel motor means having a wide variety of applications.

Another feature or advantage of the invention is to provide a novel motor means having pneumatic centralizing means for longitudinal and/or radial centralization of the rotor relative to the stator.

Further, an advantage of the apparatus is to provide novel means for directionally controlling air pressure through bearings from a source of desired or conditioned air substantially free from grit or other foreign matter and directing the air away from the bearings to avoid contamination of the bearings by foreign matter.

A further feature is to provide a novel device using fluid pressure for causing fluid, particularly of the aeroform class, to flow in a novel arrangement of differential pressures to employ a high pressure flow to redirect a low pressure flow which may contain grit, dust or other foreign matter.

Another feature is to provide a sandblaster having a novel motor for rotating the sandblast nozzle at a controlled r.p.m. by bearingless means to increase the rotational efficiency of the device.

A further novel feature is to provide a pressure differential air flow control or seal in a pneumatic tool, for example, a rotary head sandblast, to minimize decreasing of the rotational efficiency by having a high pressure flow through or around the rotor bearings bucking a low pressure fluid flow in a bearing type device by reducing contamination of the bearings due to the presence of foreign matter.

The invention contemplates a bearingless motor utilizing air pressure between adjacent surfaces spaced from one another to keep the adjacent stationary and movabe motor components from coming in contact with each other. Further, when used with certain apparatus, a differential pressure creates a seal and prevents a low pressure flow containing air and sand particles from clogging or contaminating bearings or the like which are normally disposed in the path of a high pressure air flow.

In one form, the invention contemplates a sandblasting device used in conjunction with remote carrier means for moving the sandblaster through a pipe to be coated. The motor of the sandblaster receives high pressure air through a boom, which air is discharged into an apparatus having a stator and rotor, and wherein the high pressure air is directed between the surface of a rotatable element and a cylindrical surface of the stationary complemental element to keep the rotating element effectively radially centralized without frictionally engaging the stationary element. Further, the air currents flow through selected passageways to prevent any or appreciable endwise engagement between the stator and rotor.

The boom also carries a low pressure case internally of the high pressure case but spaced therefrom so that the low pressure case directs sand, under low pressure air, through the nozzle to be sprayed on the walls of the pipe to clean and indent the surface. The high pressure air exhausted from the centering action is directed to provide a curtain of high pressure air above the centralled low pressure air and sand stream. The low pressure sand and air stream is directed outwardly through the sandblast nozzle while the high pressure annular curtain of air merges with the sand and low air pressure flow moving in the same direction and accordingly prevents any foreign matter from the low pressure stream from leaking back between the surfaces of the stator and rotor. This high pressure current which merges with and keeps out the low pressure flow which is moving in the same direction therewith toward the nozzle and prevents contamination of foreign matter in a certain area is referred to as a pressure seal. The rotating element is referred to as a spinner, and in one form carries the sandblast nozzle. However, the spinner may be a carrier for any form of rotary tool, such as a wire brush.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings which are by way of illustration only and are not to be considered as limitations, since changes and variations may be made in the invention without departing from the spirit of the invention.

In the drawings:

FIGURE 2 is a side view of the sandblasting apparatus showing it being cart-carried in the interior of the pipe to be coated.

FIGURE 3 is an end view, partially broken away, of the device shown in FIGURE 2.

FIGURE 5 is a cross-sectional view of the sandblasting apparatus taken substantially along lines 5—5 of FIGURE 4 showing the high pressure inlet ports in the housing in relation to the low pressure and sand inlet seal hub.

FIGURE 6 is a cross-sectional view taken along lines 6—6 of FIGURE 4 showing the relation of the spinner flange to the inner housing.

FIGURE 7 is a cross-sectional view taken along lines

Figures 4, 9, 11:
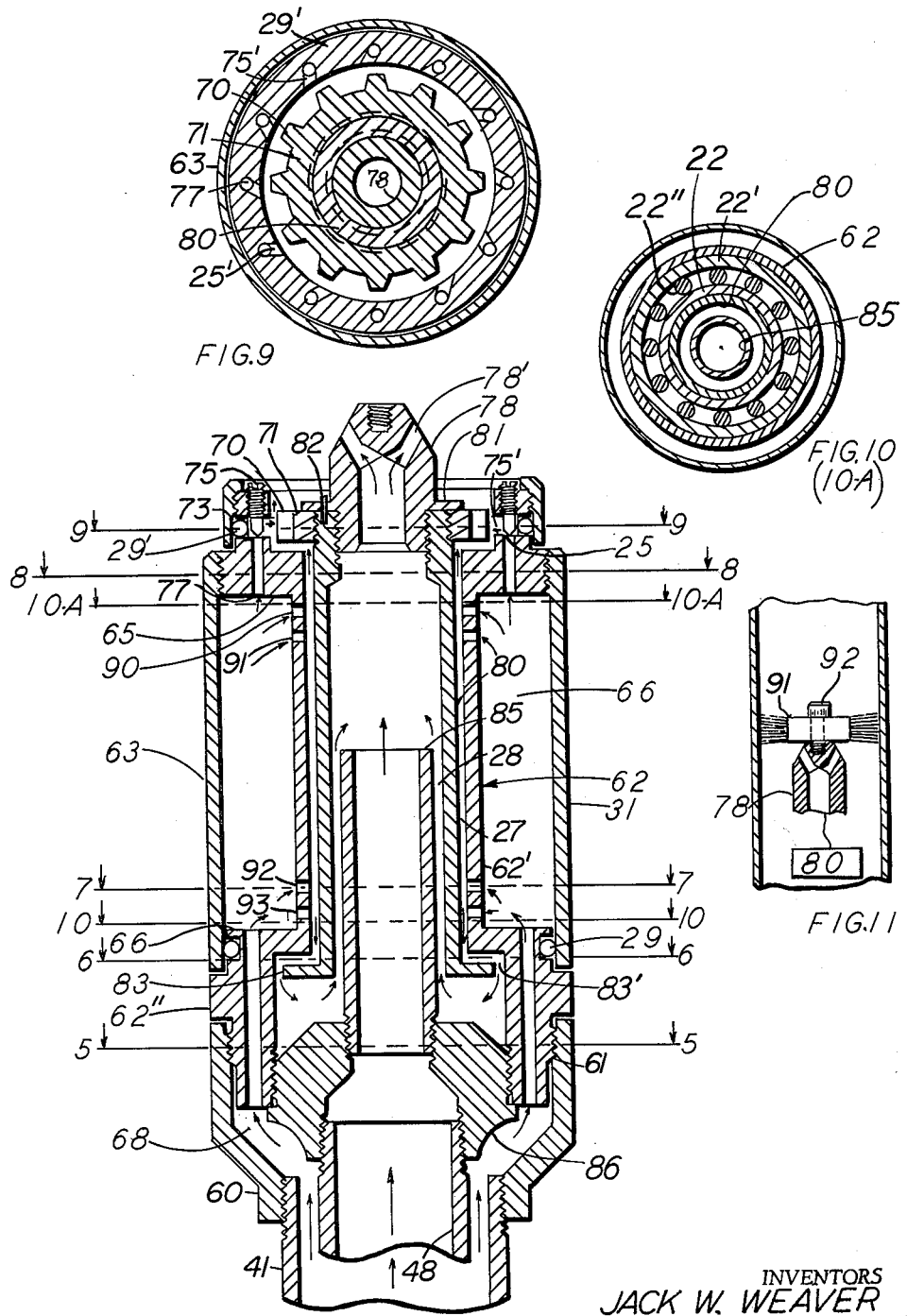
FIGURE 4 is a longitudinal sectional view taken along lines 4—4 of FIGURE 3.

7—7 of FIGURE 4 showing the spinner centralizing jets in relation to the inner housing.

FIGURE 8 is a cross-sectional view taken along lines 8—8 of FIGURE 4 showing the high pressure outlet ports for operating the rotary impeller or turbine to spin the sandblast nozzle.

FIGURE 9 is a cross-sectional view taken along lines 9—9 of FIGURE 4 showing one form of the rotor impeller in relation to the impeller driving jet ports.

FIGURE 10 is a cross-sectional view taken along lines 10—10 of FIGURE 4 showing an arrangement of employing a ball bearing assembly between the inner housing and the spinner at one end of the device and which would be a duplicate arrangement showing a view taken along lines 10-A of FIGURE 4 at the other end of the device.

FIGURE 11 is a side view of a modification utilizing the basic apparatus with a different tool, such as a wire brush, frictionlessly rotative on the end of the spinner by means of the nozzle to show the basic tool's adaptability.

Figure 1:
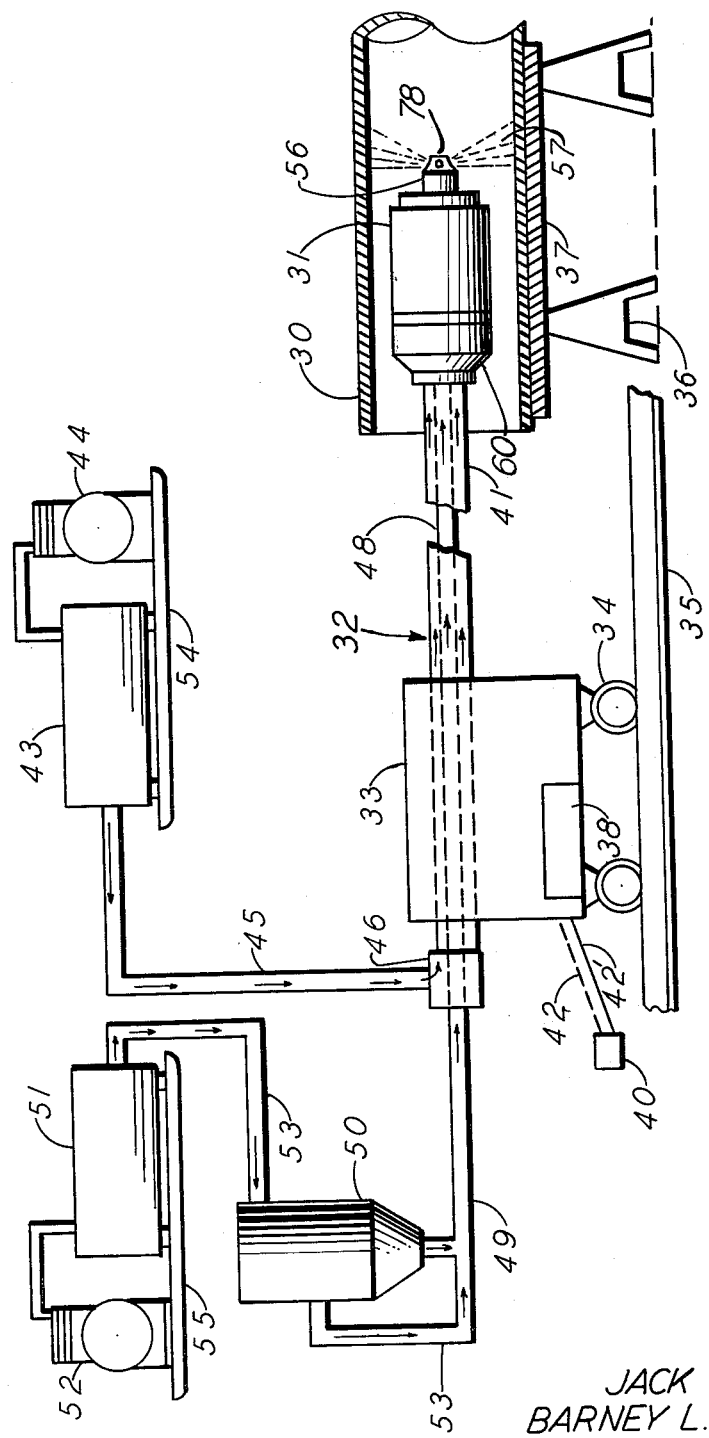
FIGURE 1 is a diagrammatic representation of a system and apparatus thereof, showing a sandblasting device for cleaning the interior of pipes to be coated.

Referring to the drawings, and more particularly to FIGURE 1, there is shown a representative section of pipe 30 to be cleaned on the interior surface thereof by an air motor and tool which may be a sandblaster 31, and which motor and tool are carried on a boom 32 by a boom cart 33 movable on wheels 34 which ride on a pair of spaced tracks, such as 35. The pipe 30 is carried on a pipe rack arrangement having a pair of work supports 36 and a pipe bed 37.

The sand blaster 31 is movable in and out of the pipe to be coated by means of the boom 32 which has the left end thereof secured in the boom cart. A motor drive 38 is carried by the boom cart and is coupled for rotating the wheels 34 under influence of the boom cart control 40, which has a broken line 42 to represent the mechanical control and a solid line 42' to represent the electrical control. The type of control is optional, and both the mechanical and electrical methods are shown, since cables may be employed to move the cart back and forth and control same from a remote position, or the control may be an electrical control for operating an electric drive 38, such as a motor.

In actual operation, it has been found quite satisfactory to have the boom cart automatically move to the right to completely sandblast the interior surface of the pipe 30, and then shut off the sandblast and reverse the cart's direction and withdraw the sandblaster completely from the pipe 30. The boom 32 itself supports the sandblaster centrally of the pipe to be cleaned and has an outer rigid case 41, which confines the high pressure air in transit from the air reservoir 43, which is air-fed by a high pressure air compressor 44, preferably by a flexible pipe line 45, into the coupling unit 46 providing coupling means for both the high pressure source and the low pressure source for operation of the sandblaster. An inner case 48 of the boom has the right end thereof coupled to the sandblaster, and the opposite end is coupled direct to the coupling unit 46 for direct coupling to the combination sand and air hose 49. Case 48 runs through the outer case 41 and is spaced therefrom so that the high pressure and the low pressure air sources are independently controllable internally of the sandblaster.

The air hose 49 combines sand from the sandblast pot 50 and low pressure air which is coupled from the low pressure air reservoir 51 as fed from the low pressure air compressor 52 directly through the flexible hose 53 and coupling 46. Ordinarily, the high pressure air compressor and the low pressure air compressor are on movable bases such as 54 and 55, respectively. The sandblast pot is preferably portable.

The sandblaster 31 is shown having a rotary nozzle 78 which rotates at high speed to project the sand, indicated by the spray lines 57, so that there is substantially radial and some forward projection of the sand under the influences of the air pressure so as to direct the particles radially within the pipe. The arrangement drives the sand particles at such an angle and with such force that the surface of the pipe is not only cleaned by the sandblast operation, but the particles of sand actually indent the inner surface of the pipe so that it is possible to provide a mechanical bond between the coating material and the inner surface of the pipe, to provide an interlocking of the coating material as it forms within the indentations.

While a sandblaster is shown as the representative tool, the tool may be a wire brush, or a different nozzle for use in spraying a liquid cleaner or even a fluid coating material. The tool to be used by the tool carrier spinner per se, is definitely not limited to a particular type or class.

Referring more particularly to FIGURES 2, 3 and 4, there is shown the boom 32 having the outer case 41 and the inner case 48 threadedly coupled to complemental ports of the sandblaster 31. The outer case 41 is threadedly coupled to threads on one end of a boom cap 60 while the opposite end of the boom cap is threadedly coupled to outside threads 61 of the inner housing 62 which forms one longitudinally extended end wall of a high pressure air reservoir within the sandblaster. The inner end of the boom cap 60 abuts one side of the inner housing ring 62" of the end wall while the other side of the inner housing ring 62' is engaged by the cylindrical outer housing 63 and provides an air-tight seal therebetween by O-ring 29. The opposite or forward end of the outer housing 63 is threadedly connected on to the front end wall 65 of the inner housing 62. The rear end wall 66 of the inner housing 62 in conjunction with the front end wall 65 and the inner and outer housings 62 and 63 respectively provide the high pressure cylindrical air reservoir 66. A series of high pressure air inlets 68 are formed longitudinally in the rear end wall 66 to provide a plurality of independent passages from the high pressure air source from the boom 32, to the high pressure air reservoir of the sandblaster. The front end wall 65 also has a plurality of high pressure outlets from the high pressure air reservoir to the turbine jets which are directed toward the impeller rotor 71 to rotate same by air pressure.

Front cap 73 has a large aperture in the front to provide an annular flange which abuts the right hand end of the inner housing end wall when the air cap 73 is threadedly secured into place on said front end wall 65 and utilizes an annular O-ring seal 29' to assist in providing an air-tight closure of the air jet ports adjacent the threads of the front cap 73.

A multiplicity of air jet control valves 75 are threadedly connected direct through the outer face of the front end wall and each has a valve seat 25 in the high pressure outlet 77. By adjusting the independent turbine air jet controls 75 either in or out, the flow of air can be controlled; that is, fed from the high pressure air reservoir 66 out the respective turbine jet ports 75' to impinge the impeller blades 70. While a simple form of impeller blade is shown in FIGURE 4, it is to be understood that a bucket-type or other suitable type blades may be utilized to increase the efficiency of the rotatable spinner.

A nozzle 78 having three nozzle ports 78' is threadedly connected to a spinner 80 at the right hand end thereof, and a flange 81 formed on the nozzle 78 abuts the outer end of the spinner 80 and the impeller rotor 71 and is held in place by a locking means, such as a pin 82, which goes through the flange 81 and into the end of the spinner. With this arrangement the nozzle 78, with spinner and the impeller rotor are all secured together as a unit. The spinner 80 is a cylindrical type element which has a nozzle on the right end and a spinner flange 83 on the opposite end thereof with the entire spinner being spacially positioned when in use between the inner housing 62, cylindrical wall 62', and the boom nipple 85. The boom nipple 85 is threadedly connected to internal threads of a pressure seal hub 86. The seal hub 86 is employed to hold the inner housing cylindrical wall 62' and the boom nipple 85 is spaced radial fixed alignment with each other so that the spinner 80 may be free to rotate therebetween, and to permit the spinner to be also longitudinally free to locate axially without binding of the spinner flange 83 and the impeller rotor 71. Accordingly, the spinner is able to rotate frictionlessly due to an air pressure cushion arrangement between the spinner and the boom nipple 85 on the inside of the spinner, and the inner housing cylindrical wall 62' and the outside of the spinner.

The boom inner case 48 is threadedly connected to one end of the seal hub 86 so that the sand and low pressure air, which are fed from the sandblast pot 50 and air reservoir 51, respectively, are fed together in a stream of sand and air through the boom nipple 85, and then out through the nozzle 78 via the nozzle ports 78'.

The air pressure provides the means for substantially centralizing or balancing the spinner between the cylindrical wall 62' of inner housing and the boom nipple 85 to prevent same from coming in contact with each other when the device is in operation. The matter of balancing the spinner about the axis of the boom nipple is provided by means of a plurality of spinner balance jet ports such as 90 and 91 on the front end of the sandblaster with a similar arrangement of spinner balance jets 92 and 93 toward the rear portion of the sandblaster, with all of said spinner balance jets being formed in the inner housing and fed from the reservoir 66. When the device is coupled for operation, the air is fed into the passageway provided between the tubular cases 41 and 48 of the boom, and then into the boom cap 60, and thence into the multiplicity of high pressure inlets 68 to feed the high pressure reservoir 66. The air from the high pressure reservoir 66 feeds the jets 90, 91, 92 and 93 to create a basic pressure cylindrical curtain of air between the inner housing and the spinner. The air from the jets 90 encounters air pressure from the jets 91, and some air is driven outwardly into the annular radial passage between the outer face of the front end wall 65 and the inner radial face of the impeller rotor 71, so that the pressure of air flowing therebetween holds the rotor spaced from the housing. Simultaneously the high pressure air from the impeller jet ports 75' are directed to impinge the impeller blades 70 for turning said rotor and simultaneously turning the spinner 80 and its sandblast nozzle 78. The air fed from the reservoir through the series of centralizing jet ports 92 encounters the air pressure from the adjacent jet ports 93 and some of the air is forced between the spinner flange 83 up over the edge thereof and then in the reverse direction between the cylindrical body of the spinner 80 and the boom nipple 95. The annular radial curtain of air impinging the flange 83 provides sufficient pressure to keep the flange 83 from coming in physical contact with the outer surface of the rear end wall 63. The radial curtain of air between the impeller rotor 71 and front end wall 65 is somewhat similar to the curtain of air between annular flange 83 and rear wall 66, so that there is a balance of pressure to provide substantial axial stability of the spinner, whereby there is very little if any axial movement. From the foregoing it will be seen that the curtains of air between the flange and rotor on opposite ends of the spinner, adjacent their complemental end walls, prevents any appreciable longitudinal movement of the spinner, thereby preventing frictional contact between spinner and housing. The opposed pressures between the adjacent annular rows of jets 91 and 92 provide bucking air currents between the spinner and inner housing.

As the high pressure annular curtain of air moves to the right within the spinner, it encounters the stream of sand and air under low pressure, moving to the right, with the annular high pressure air curtain through the boom nipple 85. Because the air current in the annular space between the spinner and the boom nipple is at high pressure, the sand and air low pressure stream from the nipple per se, will find it impossible for any of the sand which is blown into the spinner to move between the spinner and the nipple. Accordingly, the high pressure provides an air seal to prevent any sand from getting between the spinner and inner housing, or into the bearing assembly of the modification, as indicated in FIGURE 10 (or 10-A).

In FIGURE 9 it will be seen that the high pressure outlet 77 terminating the jet ports 75' impinge the impeller blades 70 which will cause the impeller rotor 71 to rotate since the turbine jet outlets are directed angularly inward to enable the rotor to turn in a given direction. The impeller blades 70 in FIGURE 4 are merely representative, and any form of impeller blades may be used on the impeller rotor coupled to the spinner 80.

Referring to FIGURE 5 it will be seen that the high pressure inlets 68 are twelve in number, but this is merely representative since the number and size of the inlets would depend on the other dimensions of the device to adequately provide the necessary pressure within the reservoir 66 to perform in a manner desired for a particular size apparatus. The seal hub 86 is shown in relation to the nipple 85 and the boom cap 60.

FIGURE 6 shows the outer housing 63 in relation to the inner housing. The high pressure inlets 68 and the spiner flange 83 are shown in relation to the boom nipple 85 and the spinner 80, with the high pressure annular curtain of air space 28 between said nipple and said spinner. The space between the outer annular edge of the flange 83 and the extended end wall 66 is indicated at 83'.

In FIGURE 7 the reservoir 66 is shown feeding the air jets 92 and driving against the spinner 80 to provide the annular outer curtain of air 27 therebetween for keeping the spinner and the inner housing from relative radial movement. The annular inner space 28 for the annular air curtain is also shown between the spinner 80 and the nipple 85.

In FIGURE 8 the ports or high pressure outlets 77 are shown formed in a circumferential array in a front end wall 65 of the inner housing with the centralizing curtain of air in space 27 between the inner housing end wall 65 and the spinner 80.

FIGURE 9 shows the impeller rotor 71 with the impeller blades 70 positioned relative to the jet ports 25' from the high pressure outlets 77. The annular resilient sealing ring 29' is shown in its annular complemental groove in the extended inner housing end wall for sealing the high pressure outlets or ports 77 against escaping air except through jet ports 75'.

In FIGURE 10 there is shown an arrangement wherein a plurality of ball-bearing assemblies having inner and outer races 22 and 22', respectively, and ball bearings 22" are employed in a modification, between the inner housing and the spinner. While the preferred arrangement is to use the device with air centralization of the spinner, it is to be understood that the device or apparatus can be employed with ball bearings or the like such as would be positioned between the inner housing 62 modification and the spinner 80 of a modification. The spaced bearing assemblies or the like could be used in the modified form without departing from the basic concept of the high pressure between the elements 62 and 80, and also between 80 and 85 for preventing the low pressure air and sand stream from entering the space between the boom nipple 85 and the spinner; accordingly, the high pressure would work as a high pressure annular seal to keep the sand away from the bearings yet permit the device to rotationally operate, and cause the sand and air to be ejected at high speed substantially radially and forwardly as the sandblaster device is moved through the pipe to be coated.

While the sandblaster may be employed to work as it enters or leaves the pipe to be cleaned or sandblasted, it is preferable to employ the sandblaster as it enters the pipe so that the air stream and sandblast would be urged forwardly and provide a substantially residue-free inner surface, whereas, if the nozzle were employed as it is by the boom cart drawn to the left, the sand residue within the pipe might be quite appreciable, depending on the characteristics of the sandblaster nozzle.

The device shown in FIGURE 11 is a modification of the tool with its spinner or rotary carrier 80, having a wire brush as the tool to be rotated. In FIGURE 11, the wire brush 91 has wire bristles that engage the inside of a pipe to be cleaned (or sprayed) and is carried on a stud 92 threadedly connected into the center of a sandblast nozzle, or may use any type of tool carrier with an air outlet, and secured on the spinner in any convenient or conventional manner.

While one form of the device has been referred to herein as the "Sandblaster," it is to be understood that any form of abrasive or other material, depending on the particular type of surface finish desired, may be used.

In FIGURE 4, the flange 83 is shown as being flat in an annular form and extending radially with a gap between the inner surface of the radially extending flange and the rear surface of the rear end wall. The rotor 71 forms a transverse flange portion having a radially extending wall surface affixed on one end of the rotor opposite the end of the motor on which the flange 83 is affixed. The annular curtain of air which extends longitudinally in opposite directions from the various stator ports, such as 93 and 90, impinges the flanges or flange-type portions and the complemental end walls adjacent opposite ends of the rotor.

The air under pressure passing outwardly between the respective flange-type portions and complemental end walls in a radial direction keeps the flange portions from coming into physical contact with the stator end walls. However, the end walls such as 65 and 66 may have longitudinally extending ports formed therein, similar to ports such as 92 and 93, but they would be disposed for having the air from the reservoir 66 directed axially outwardly to impinge the respective flange or flanges. In this manner the axial centering ports are specifically designed for longitudinally centralizing the rotor relative to the stator by the air force from the horizontally positioned ports which would be equidistantly spaced about the end walls so that the air under pressure would impinge its respective complemental flange. Further, the air ports would have air flow screws projecting into said ports for controlling the quantity of air emitted from the various ports so that there would be a mechanical adjustment of air flow central of the ports, somewhat similar to the adjustment of the control screws 75.

In operation, the device may be made without utilizing a specific rotor, as a separate item, as shown herein. This is possible since the jets of the sandblast nozzle ports may be angularly disposed in a plane normal to the axis, but at a tangent to a radial projection. Accordingly, there would be a rotary thrust imparted to the rotor for turning the spinner without a special impeller, such as the rotor with blades. Further, the rotor impeller, as such, may be eliminated entirely by utilizing a conventional multiple opening sandblast nozzle, and merely drilling holes in the nozzle at a plane normal to the axis thereof but at a tangent to the radius to provide a driving force imparted to the spinner for rotating the nozzle.

Naturally, if the rotor 71 were omitted it would of course be necessary to employ some form of longitudinal or axial centralization of the spinner in the bearingless type device. This may be taken care of by utilizing a flange similar to 83 on the opposite end of the spinner in lieu of the rotary flange impeller. However, the jet ports in the end walls may be used in conjunction with a deflecting element such as a flange to generate sufficient pressure between the proper surfaces to provide the desired axial centralization.

While a rotary impeller has been shown used on one end of the rotor with a flange on the other, devices have been built which work satisfactorily and utilize a rotor on each end of the spinner without employing an independent flange, such as 83. It is to be understood that when a rotary impeller is substituted for the flange 83, the rotary impeller would of course have a flange-type portion, not unlike that shown on the impeller 71.

While we have shown air as being the only centralizing force herein for longitudinally balancing or centralizing the rotor, it is to be understood that if the nozzle per se is used as the means for rotating the spinner, thrust bearings may be employed adjacent either the front or the rear of the spinner or at both ends. The thrust bearings may also be used in the type of apparatus described herein as employing bearings for the rotary assembly and also may be used in the type which is bearingless, as far as permissive rotary motion is concerned, but may employ thrust bearings to limit the axial longitudinal movement of the spinner. In the present showing, there are passageway means for coupling a second air flow and a source of abrasive particles to the nozzle inlet means, with said passageway means being disposed relative to the disposition of the port means to provide pressure differential within the apparatus to prevent the flow of abrasive particles between the stator and the rotor.

While the device shown uses a stationary outside stator and a rotary inside spinner, a device has been built and successfully operated utilizing the rotor as being the outer member disposed about the stator, which is mounted on a base, the sandblast arrangement employed a multiplicity of independent sandblast nozzles of different types supported by the outside rotor. Further, the outside rotor has been used for centrifugally ejecting the sand with a centrifugal force sufficient to indent the surface with the particles and clean same with the abrasive when the outside rotor was in operation. In the latter device a centrifugal force alone was used to project sand as a cleaning means without utilizing air as a motive force. While ports have been shown throughout and surface passageways are formed, it is to be understood that the present invention is merely one form of a pneumatic motor, having very specific uses. The present invention has been successfully used on from 2 inch to 12 inch pipe. However, the test devices have been employed for sandblasting in pipe up to 3 feet in diameter. Naturally, the device may be enlarged proportionately or relatively to accomplish the particular results desired in a given size or type of pipe.

In operation, as the sand and air stream is driven through the spinner and the particles impact against the nozzle and deflect outwardly, the impact of the sand and air causes a very heavy axial thrust forward or toward the nozzle. Accordingly, the proportion or size of parts is such that it is impossible for all of the air to escape forwardly thereby necessitating a rearward flow of air between the flange and end walls at all times. Naturally some ports may be larger than others for the purpose of permitting an increased flow in one direction. Further, in the use of the device, and particularly in the rotary bearing model, an arrangement has been used wherein the forward thrust has a larger hub carried thereby which moves into a stationary cylindrical cup so that the increased axial forward thrust would cause increased compression between the hub and the cylindrical cup to counteract the forward thrust.

While the terms "high pressure" and "low pressure" have been used, these terms are relative. In actual practice the low pressure may range generally from 30 to 125 p.s.i., while the high pressure may range generally from 125 to 1,000 p.s.i. Naturally the operating pressure range would vary depending on the size of the pipe, tank, apparatus, device, or job to be done.

While certain novel features of the invention have been disclosed, it is to be understood that changes and modifications may be made in the invention by those skilled in the art without departing from the spirit of the invention as set forth in the annexed claims.

What is claimed as new and desired to be secured by Letters Patent of the United States is:

1. A pneumatic motor comprising a stator, a rotor disposed relative to said stator, said stator and said rotor each having complemental annular surface portions, the diameter of one annular surface portion being different from the diameter of said other annular surface portion, coupling means for coupling an air pressure source between said complemental annular surface portions including port means for directing the air under pressure to impinge said complemental annular surfaces of said stator and said rotor to provide effective radial centralization of the rotor relative to the stator when sufficient air pressure from said source is applied to said coupling means, and blade means carried by said rotor and disposed to be impinged by said air pressure to turn said rotor within said stator.

2. A pneumatic motor comprising a stator, a rotor disposed relative to said stator, said stator and said rotor each having complemental annular surface portions, the diameter of one annular surface portion being different from the diameter of said other annular surface portion, port means carried by said rotor for directing air under pressure to impinge said complemental annular surfaces of said rotor, coupling means for coupling an air source to said port means so that the air from said port means provides effective radial centralization of the rotor relative to the stator when sufficient air pressure from said source is applied to said coupling means without the use of ball bearings between said stator and said rotor, and blade means carried by said rotor and disposed to be impinged by said air pressure to turn said rotor within said stator.

3. A pneumatic motor comprising a stator, a rotor disposed relative to said stator, said stator and said rotor each having complemental annular surface portions, the diameter of one annular surface portion being different from the diameter of said other annular surface portion, coupling means for coupling an air pressure source between said complemental annular surface portions including port means for directing the air under pressure to impinge said complemental annular surfaces of said stator and said rotor to provide effective radial centralization of the rotor relative to the stator when sufficient air pressure from said source is applied to said coupling means, blade means carried by said rotor and disposed to be impinged by said air pressure to turn said rotor within said stator, a tool to do work in cleaning an object carried by said rotor, and surfaces carried by said rotor to direct some of the air under pressure from internally of adjacent said tool to facilitate blowing away the residue from the cleaning done by said tool.

4. A pneumatic motor comprising a stator, a rotor disposed relative to said stator, said stator and said rotor each having complemental annular surface portions, the diameter of one annular surface portion being different from the diameter of said other annular surface portion, coupling means for coupling an air pressure first source between said complemental annular surface portions including port means for directing the air under pressure from said first source to impinge said complemental annular surface of said stator and said rotor to provide effective radial centralization of the rotor relative to the stator when sufficient air pressure from said first source is applied to said coupling means, blade means carried by said rotor and disposed to be impinged by said air from said air pressure first source to turn said rotor within said stator, a tool having ports therein coupled to said air pressure first source carried by said rotor, an air pressure second source, a source of abrasive material particles, and passageways coupling said air pressure second source and said abrasive material particles with said tool having ports therein to simultaneously emit said abrasive and air from said first and said second sources.

5. A pneumatic motor having a stator with a cylindrical element having an inner annular surface of a predetermined diameter and with port means formed therein, a rotor having a cylindrical element with an annular outer surface of a predetermined diameter smaller than said predetermined diameter of the stator, said predetermined diameters of said stator and said rotor being of a dimension to permit relative rotary motion between said stator and rotor without frictional contact therebetween, said port means in said stator being directed toward said rotor to provide effective radial centralization of said rotor relative to said stator under influence of a suitable air flow, blade means carried by one end of said rotor and disposed to be impinged by the air flow to turn said rotor, flange means carried by the other end of said rotor, said blade means and said flange means being positioned to be impinged by said air flow to effectively longitudinally position the rotor substantially centrally of the stator without physical contact therewith under the influence of said air flow.

6. A pneumatic motor having a stator with a cylindrical element having an inner annular surface of a predetermined diameter and with port means formed therein, a rotor having a cylindrical element with an annular outer surface of a predetermined diameter smaller than said predetermined diameter of the stator, said predetermined inner and outer annular diameters each being of a dimension to permit relative rotary motion between said stator and rotor without frictional contact therebetween, said port means in said stator being directed toward said rotor for directing air flow against the rotor to provide effective radial centralization of said rotor relative to said stator when coupled to a suitable air flow, rotor blade means, including a transverse flange type portion carried by said rotor adjacent one end thereof and disposed to be impinged by the air flow to turn said rotor, and transverese flange means carried by the rotor adjacent the end opposite the end carrying the rotor blade means, and surfaces disposed to direct said suitable air flow simultaneously against said transverse flange means and said transverse flange type portion to provide effective axial centralization of said rotor.

7. A pneumatic motor having a stator with a cylindrical element having an inner annular surface of a predetermined diameter and with port means formed therein, a rotor having a cylindrical element with an annular outer surface of a predetermined diameter smaller than said predetermined diameter of the rotor, said predetermined diameters being of a dimension to permit relative rotary motion between said stator and rotor without frictional contact therebetween, said port means in said stator being directed toward said rotor, rotor transverse flange portions affixed adjacent opposite ends of said rotor and spaced axially from said stator cylindrical element to be impinged by air flow from certain of said port means, passageway surfaces formed in said stator and coupled to said port means for directing air flow against the rotor cylindrical element and the rotor transverse flange portions to provide effective radial and axial centralization of said rotor relative to said stator, and blade means carried by said rotor disposed to be impinged by the air flow to turn said rotor.

8. A bearingless sandblasting apparatus for pneumatically rotating a sandblast nozzle and to emit therefrom sand particles driven at a velocity sufficient to clean the surface of an object impinged by said sand particles, comprising a stator, a rotor disposed therein and being free to turn without engaging said stator, blade means carried by the rotor and disposed to be impinged by an air flow to turn said rotor, and a sandblast nozzle having inlet and outlet ports secured to said rotor for rotational movement therewith, said stator having port means disposed to direct air flow against said rotor for effectively radially centralizing the rotor within the stator and for impinging said blade means to turn said rotor upon subjection to said air flow.

9. A bearingless sandblasting apparatus for pneumatically rotating a sandblast nozzle and to emit therefrom sand particles driven at a velocity sufficient to clean the surface of an object impinged by said sand particles, comprising a stator, a rotor disposed therein and being free to turn without engaging said stator, blade means carried by the rotor and disposed to be impinged by an air flow to turn said rotor, and a sandblast nozzle having inlet and outlet ports secured to said rotor for rotational movement therewith, said stator having port means therein disposed to direct air flow against said rotor for effectively radially and axially centralizing the rotor within the stator and for impinging said blade means to turn said rotor under influence of said air flow.

10. A sandblasting apparatus for pneumatically rotating a sandblast nozzle and to emit therefrom sand particles driven at a velocity sufficient to clean the surface of an object impinged by said sand particles, comprising a stator, a rotor disposed therein and being free to turn, blade means carried by the rotor and disposed to be impinged by an air flow to turn said rotor, and a sandblast nozzle having inlet and outlet ports secured to said rotor for rotational movement therewith, said stator having port means therein disposed to direct air flow against said rotor for effectively axially centralizing the rotor within the stator and for impinging said blade means to turn said rotor.

11. A bearingless sandblasting apparatus for pneumatically rotating a sandblast nozzle and to emit therefrom sand particles driven at a velocity sufficient to clean the surface of an object impinged by said sand particles, comprising a stator, a rotor disposed therein and being free to turn without engaging said stator, blade means carried by the rotor and disposed to be impinged by an air flow to turn said rotor, a sandblast nozzle having inlet and outlet ports secured to said rotor for rotational movement therewith, said stator having port means therein disposed to direct air flow against said rotor for operatively centralizing the rotor within the stator and for impinging said blade means to turn said rotor under influence of said air flow, and passageway means for coupling a second air flow and a source of abrasive particles to said sandblast nozzle inlet means.

12. A bearingless sandblasting apparatus as set forth in claim 11, and wherein first said air flow is moving under a pressure higher than the pressure of said second air flow.

13. A bearingless sandblasting apparatus as set forth in claim 11, and wherein first said air flow and said second air flow are under relatively high pressure and low pressure, respectively, and both air flows are merged in the same direction to increase the velocity of the particles over the velocity provided by the second air only.

14. A bearingless sandblasting apparatus for pneumatically rotating a sandblast nozzle and to emit therefrom sand particles driven at a velocity sufficient to clean the surface of an object impinged by said sand particles, comprising a stator, a rotor disposed therein and being free to turn without engaging said stator, blade means carried by the rotor and disposed to be impinged by an air flow to turn said rotor, a sandblast nozzle having inlet and outlet ports secured to said rotor for rotational movement therewith, said stator having port means therein disposed to direct air against said rotor for operatively centralizing the rotor within the stator, both radially and axially, and for impinging said blade means to turn said rotor under influence of said air flow and passageway means for coupling a second air flow and a source of abrasive particles to said nozzle inlet means, said passageway means being disposed relative to the disposition of said port means to provide pressure differential within the apparatus to prevent the flow of abrasive particles between said stator and said rotor.

15. A sandblasting system for emitting abrasive particles at an object cleaning velocity, comprising a rotary sandblast apparatus having a rotor and a stator, nozzle means carried by said rotor for emitting said abrasive particles therefrom, surfaces forming first passageways carried by said apparatus for pneumatically spacing said stator and said rotor from one another and for providing rotational movement to said rotor under influence of air flow surfaces of the apparatus forming second passageways to direct the abrasive particles to be emitted from the apparatus, and relatively high pressure and relatively low pressure sources of air flow coupled respectively to said first passageways and said second passageways to provide a pressure differential internally of the apparatus restricting abrasive flow substantially to a predetermined direction.

References Cited in the file of this patent

UNITED STATES PATENTS

| | | |
|---|---|---|
| 2,177,053 | Boyd | Oct. 24, 1939 |
| 2,752,196 | Chisholm et al. | June 26, 1956 |
| 2,755,598 | Van Denburgh | July 24, 1956 |
| 2,934,824 | Braybrook et al. | May 3, 1960 |